3,334,053
GELLED ORGANIC SOLVENTS

Ludwig F. Audrieth, Champaign, Ill., and Sydney Axelrod, New York, N.Y., assignors to the United States of America as represented by the Secretary of the Army
No Drawing. Filed Apr. 15, 1965, Ser. No. 448,549
7 Claims. (Cl. 252—316)

This application is a continuation-in-part of application Ser. No. 165,968, filed Jan. 12, 1962, for Gelled Organic Solvents, now abandoned.

The invention described herein may be manufactured and used by or for the Government for governmental purposes, without the payment to us of any royalty thereon.

This invention relates to a method for gelling organic solvents and to compositions of matter in the form of gels. More specifically, the invention concerns gelled mixtures produced by proper admixture of one or more organic solvents, a relatively small amount of cellulose ester and a gelling agent.

Cellulose esters are readily soluble in solvents, such as, the lower alkyl acetates, alcohols, nitroparaffins, hydroxyketones or nitrobenzene, but solutions of these solvents containing a cellulose ester in concentrations of less than 10% by weight do not thicken appreciably to form gels.

We have now discovered that organic solvents, such as those mentioned above, can be formed into gelatinous mixtures containing a minor amount of cellulose ester and that the solvent content of said mixtures may be as high as 95% by weight. Thus, solvents which are highly volatile, combustible and free-flowing may now be converted into nonvolatile, nonflowing solid gels possessing desirable and useful properties as solid propellant fuels or as adhesive mixtures.

In connection with solutions of a highly combustible nature, for example, cellulose nitrate dissolved in nitromethane, the present method for forming gels minimizes the dangers encountered by previous gel-forming techniques in which concentrated solutions prepared at elevated temperatures were gelled upon cooling. In addition to the comparable ease and safety of the present method in conferring solid characteristics to cellulose ester solutions, it should also be noted that the method is particularly advantageous in view of the wide variety of solvents that can be gelled in this manner.

In addition to the gelation phenomenon mentioned above, the present invention also provides means for stabilizing the gels, the ability of the gelled mixture to prevent liquid separation (syneresis) being substantially improved by the addition of suitable stabilizers.

The primary object of the present invention is to provide a novel method for gelling solutions of cellulose esters in a wide variety of organic solvents.

Another object of the invention resides in solid gelled mixtures which may be used as propellant fuels or as adhesives.

A further object of the invention is to provide means for stabilizing the gelled solvents described herein.

Other and further objects will become apparent from the following detailed description.

According to our invention, the addition of an amine to a solution of a cellulose ester in an organic solvent will cause the entire mixture to gel. Preferably the cellulose ester is first dissolved in one or more solvents, the amine is then added at room temperature and the resulting mixture is allowed to stand until gelation has taken place. In some instances gelation occurs rapidly and may form immediately upon bringing together the respective ingredients. In most other cases, however, the transition from liquid to gel is a gradual one and requires sufficient time for the mixture to become completely gelled.

The present gels may be used in various ways depending upon the specific ingredients. Gels containing cellulose nitrate may be used as solid fuels characterized by a high burning rate and producing considerable heat. Cellulose acetate and other cellulose esters in compositions such as those described and prepared by the present method have considerable utility as adhesive compositions. These compositions can be utilized to produce a strong bond between various types of structural materials.

Illustrative examples of cellulose esters which have been found to be suitable for the present mixtures are cellulose nitrate, cellulose acetate and cellulose acetate-butyrate. Cellulose esters are available in various grades based on (1) the degree of polymerization as specified by viscosity and (2) the degree of substitution of the hydroxy groups by nitrate, acetate or butyrate groups. Variations in viscosity and esterification of these esters are equally applicable for gelation, and such variations are clearly within the purview of the present invention.

Solutions of the cellulose esters are formed with any one or combination of solvents, such as the lower alkyl acetates (e.g. methyl, ethyl, propyl and butyl), lower alkyl alcohols (e.g. methyl, ethyl, propyl and butyl), lower nitroparaffins (e.g. methane, ethane and propane), diacetone alcohol, nitrobenzene and chloroform. The cellulose esters are dissolved in said solvents in concentrations in the range of about 2% to 7% solids, and such solutions will not gel without the addition of an amine compound as disclosed herein.

Various amine compounds have been found to be effective gelling agents: aliphatic amines, such as, ethylamine, ethylenediamine, diethylenetriamine, triethylamine and n-propylamine; saturated cyclic amines, such as, cyclohexylamine; and hydroxy amines, such as, ethanolamine. These compounds are effective gelling agents either in the anhydrous or hydrated form. The amount of amine used may vary from about 3% to 15%, although generally 4% to 6% is sufficient to produce gels.

During gel formation and immediately thereafter, there is a tendency for a portion of the liquid to separate from the gel (syneresis). The addition of a hydroxy compound to the solution has been found to be capable of delaying the onset and the rate at which syneresis of the gel takes place. Thus, a hydroxy compound which is soluble in the organic solvent may be added in relatively small amount to retard separation of liquid from the gel. Hydroxy compounds such as, glycerol, ethylene glycol, triethylene glycol, methanol, ethanol, or even water, when added in amounts of about 4% to 10% by weight are effective as gel stabilizers. The beneficial effects from the inclusion of a hydroxy compound are best derived when said compound is added to the solvent or to the mixture containing the amine prior to the gelation of the mixture.

Other ingredients which do not adversely affect the gelling properties may also be included therein. For example camphor or tributyl phosphate, which are excellent plasticizers for cellulose esters, may be included in gels which are used for bonding purposes, as will be shown in the examples given below. Polyethylene glycol is also an excellent stabilizer when added to a solvent containing a cellulose ester and an amine prior to the complete gelation of the mixture.

The following examples serve to illustrate the invention and to indicate to those skilled in the art the manner in which the invention may be carried out in practice. It should be emphasized, however, that the examples are not limiting and that the art illustrated thereby is susceptible of logical extension and modification.

Example I

A solution was prepared by dissolving 7 parts by weight of cellulose acetate-butyrate in 95 parts by weight of nitromethane and the solution was then separated into two parts. Ethylenediamine was added to one part thereof while the solution was stirred at 70° F. This mixture containing

|  | Percent by wt. |
|---|---|
| Cellulose acetate-butyrate | 6.5 |
| Nitromethane | 88.5 |
| Ethylenediamine | 5 | was completely gelled in approximately 24 hours. The other part containing the cellulose acetate-butyrate dissolved in nitromethane did not gel.

Example II

A solution was prepared by dissolving 5 parts by weight of cellulose nitrate in 95 parts by weight of butyl acetate. The cellulose nitrate had a nitrogen content of 11.8–12.2% and a viscosity of 16 seconds as determined by the falling ball method described in the nitrocellulose handbook published by the Hercules Powder Company (1948). This solution was stirred while 5.25 parts by weight of diethylenetriamine were added to the solution at room temperature. The mixture gelled in approximately 14 minutes and syneresis was observed in about 5 minutes after complete gelation. Liquid separation resulted in a loss of about 72% of the solvent in 45 minutes.

The above mixture of cellulose nitrate, butyl acetate and diethylenetriamine was repeated and 5 parts by weight of glycerol was also added and stirred. The mixture gelled but it was noted that syneresis was not observable in less than 30 minutes.

Example III

A solution was prepared by dissolving cellulose nitrate having a nitrogen content of 13.40% and a viscosity of 10 seconds in nitromethane. Ethylenediamine was added while the solution was stirred at room temperature to provide the following mixture:

|  | Percent by wt. |
|---|---|
| Cellulose nitrate (13.40% N) | 4.75 |
| Nitromethane | 90.5 |
| Ethylenediamine | 4.75 |

The mixture gelled immediately at room temperature and syneresis was observable in approximately 5 minutes after gelation.

Example IV

A mixture containing the cellulose nitrate specified in Example III was prepared with glycerol added to give the following mixture:

|  | Percent by wt. |
|---|---|
| Cellulose nitrate (13.40% N) | 4.6 |
| Nitromethane | 86.4 |
| Glycerol | 4.5 |
| Ethylenediamine | 4.5 |

This mixture gelled immediately at room temperature and no syneresis was noticeable until 1 hour after gelation.

Example V

Cellulose acetate having a viscosity of 85–120 seconds and 52.5% acetic substitution was dissolved in methyl acetate and ethylamine was added while the solution was stirred at room temperature. The resulting mixture was allowed to stand for about 15 hours in order for it to gel completely. The gelled mixture had the following composition:

|  | Percent by wt. |
|---|---|
| Cellulose acetate (52.5% acetic substitution) | 3 |
| Methyl acetate | 93 |
| Ethylamine | 4 |

Example VI

The following mixture was prepared as in the previous examples and employs a hydroxy ketone as the gelled solvent.

|  | Percent by wt. |
|---|---|
| Cellulose acetate (52.5% acetic substitution) | 6 |
| Diacetone alcohol | 88 |
| Ethylenediamine | 6 |

The mixture gelled in about 20 hours.

Example VII

The following mixture was prepared as in previous examples and following gelation the gel showed retardation of syneresis by the presence of a glycol.

|  | Percent by wt. |
|---|---|
| Cellulose acetate | 3 |
| Nitromethane | 85 |
| Ethylenediamine | 5 |
| Ethylene glycol | 7 |

The mixture gelled in 15–20 hours and showed no syneresis for 65 minutes after gelation was complete.

Example VIII

The following gelled mixture indicates the beneficial effect of water in retarding syneresis.

|  | Percent by wt. |
|---|---|
| Cellulose acetate | 6 |
| Nitromethane | 85 |
| Ethanolamine | 5 |
| Water | 4 |

The mixture gelled in 15–20 hours and showed no separation of liquid for 75 minutes after gelation. Without the water component, the mixture gelled in approximately the same time but exhibited considerable liquid separation before gelation was complete.

Example IX

A solution was prepared by dissolving 15 parts by weight of cellulose nitrate having a viscosity of one-half second and a nitrogen content of 11.8–12.0% in a solvent mixture of 47.5 parts by weight nitromethane and 10 parts by weight of butyl acetate. Six parts by weight of camphor were added to the solution. Ethylenediamine in about 5 parts by weight was added while the solution was stirred. The mixture gelled in approximately 3 minutes. The gelled mixture was applied to two sheets of paper, and said sheets were then pressed together and air-dried. A strong bond was formed between the sheets.

Example X

Nine parts by weight of cellulose acetate having a viscosity of 85–100 seconds and 52.0–53.5% acetic acid substitution were dissolved in 86 parts by weight of a solvent mixture comprising 40 parts by weight of nitromethane, 11 parts by weight ethyl alcohol and 35 parts by weight of acetone. Three parts of tributyl phosphate were added and dissolved in the solution. Five parts by weight of ethylenediamine were added while the solution was stirred. The mixture gelled in approximately 18 hours and when used to bond two sheets of paper together, the mixture formed a strong bond.

Mixtures which gel immediately upon bringing the respective ingredients together may be advantageously formed at the exit point of a multiple nozzle. The various ingredients may be mixed as they are sprayed or squirted from hoses to provide a gelled mixture which will not seep through sand or loose gravel.

It is to be understood of course that other substituents and modifications are possible without departing from the spirit and scope of the invention as set forth in the appended claims.

We claim:
1. An organic gel consisting essentially of
(a) 2 to 7 percent by weight of a cellulose ester,
(b) 70 to 95 percent by weight of a solvent selected from the group consisting of
   lower alkyl acetates
   lower alkyl alcohols
   lower nitroparaffins
   nitrobenzene
   diacetone alcohol
(c) 3 to 15 percent by weight of an amine selected from the group consisting of
   ethylamine
   ethylenediamine
   diethylenetriamine
   ethanolamine
   triethylamine
   n-propylamine
   cyclohexylamine
(d) 3 to 20 percent by weight of the final mixture of a hydroxy compound to retard syneresis of said gel, said compound being selected from the group consisting of
   glycerol
   ethylene glycol
   triethylene glycol
   water.
2. An organic gel consisting essentially of
(a) 2 to 7 percent by weight of a cellulose ester,
(b) 70 to 95 percent by weight of lower alkyl acetates,
(c) 3 to 15 percent by weight of an amine selected from the group consisting of
   ethylamine
   ethylenediamine
   diethylenetriamine
   ethanolamine
   triethylamine
   n-propylamine
   cyclohexylamine
(d) 3 to 10 percent by weight of a hydroxy compound selected from the group consisting of
   methanol
   ethanol.
3. An organic gel consisting essentially of
(a) 2 to 7 percent by weight of a cellulose ester,
(b) 70 to 95 percent by weight of lower nitroparaffins,
(c) 3 to 15 percent by weight of an amine selected from the group consisting of
   ethylamine
   ethylenediamine
   diethylenetriamine
   ethanolamine
   triethanolamine
   n-propylamine
   cyclohexylamine
(d) 3 to 10 percent by weight of a hydroxy compound selected from the group consisting of
   methanol
   ethanol.
4. An organic gel consisting essentially of about 5 parts by weight of ethylenediamine, about 95 parts by weight of nitromethane and about 5 parts by weight of cellulose nitrate.
5. An organic gel in accordance with claim 4 which includes glycerol in about 5 percent by weight of the final mixture.
6. An organic gel consisting essentially of about 3 percent by weight cellulose acetate, about 85 percent by weight nitromethane, about 5 percent by weight ethylenediamine and about 7 percent by weight of ethylene glycol.
7. An organic gel consisting essentially of about 6 percent by weight of cellulose acetate-butyrate, about 85 percent by weight nitromethane, about 5 percent by weight of ethanolamine and about 4 percent by weight of water.

References Cited
UNITED STATES PATENTS
2,712,989  7/1955  Maisner.

OTHER REFERENCES
395,694  7/1933  Great Britain.

LEON D. ROSDOL, Primary Examiner.
R. D. LOVERING, Assistant Examiner.